United States Patent [19]

Lewis et al.

[11] Patent Number: 5,726,567
[45] Date of Patent: Mar. 10, 1998

[54] NETWORK-CONNECTABLE DISPLACEMENT SENSOR WITH STORED ID

[75] Inventors: Adrian Vivian Lewis, Chichester; Stephen Tony Kuc, Emsworth; Douglas Dennis Weller, Bognor Regis; Robert Stuart Burridge, Gosport; Kevin Anthony Snoad, Chichester, all of England

[73] Assignee: Solartron Group Limited, England

[21] Appl. No.: 415,571

[22] Filed: Apr. 3, 1995

Related U.S. Application Data

[63] Continuation of Ser. No. 995,631, Dec. 17, 1992, abandoned.

[30] Foreign Application Priority Data

Dec. 20, 1991 [GB] United Kingdom ............... 9127112

[51] Int. Cl.$^6$ .................. G01B 7/14; G01R 33/00
[52] U.S. Cl. .................. 324/207.16; 324/207.24
[58] Field of Search .................. 324/207.11, 207.12, 324/207.16, 207.18, 207.19, 207.24; 364/571.01, 579, 505, 138, 132; 340/825.07, 825.06; 361/728, 729, 731, 735

[56] References Cited

U.S. PATENT DOCUMENTS

| | | |
|---|---|---|
| 3,181,961 | 5/1965 | Nopper . |
| 3,790,910 | 2/1974 | McCormack . |
| 4,041,470 | 8/1977 | Slane et al. ............... 364/900 |
| 4,335,442 | 6/1982 | Backe . |
| 4,349,746 | 9/1982 | Grossner et al. . |
| 4,401,351 | 8/1983 | Record ............... 361/735 |
| 4,831,558 | 5/1989 | Shoup et al. . |
| 4,914,610 | 4/1990 | Shimizu et al. . |
| 4,930,096 | 5/1990 | Shimizu et al. . |
| 5,006,797 | 4/1991 | Smith . |

FOREIGN PATENT DOCUMENTS

| | | |
|---|---|---|
| 0079086 | 5/1983 | European Pat. Off. . |
| 2060897 | 5/1981 | United Kingdom . |
| 2097536 | 11/1982 | United Kingdom . |
| 2115930 | 9/1983 | United Kingdom . |
| 2207511 | 2/1989 | United Kingdom . |
| 2207512 | 2/1989 | United Kingdom . |
| 2207765 | 2/1989 | United Kingdom . |
| 8800364 | 1/1988 | WIPO . |

*Primary Examiner*—Walter E. Snow
*Attorney, Agent, or Firm*—Lerner, David, Littenberg, Krumholz & Mentlik

[57] ABSTRACT

A displacement sensor comprises a measuring head which measures displacement by variation in frequency of an oscillator due to movement of a core in a coil. The signal from the oscillator is used to gate a high frequency crystal clock into a counter. The count is representative of the change in frequency of the oscillator and thus the displacement to be measured. The count is compared by a microprocessor with a look-up table stored in the memory during initial calibration. The operating and processing electronics connected to the sensor head are mounted in a connector which can be directly coupled to connectors of other sensors to form a bus connecting multiple sensors to a data logger or computer.

8 Claims, 2 Drawing Sheets

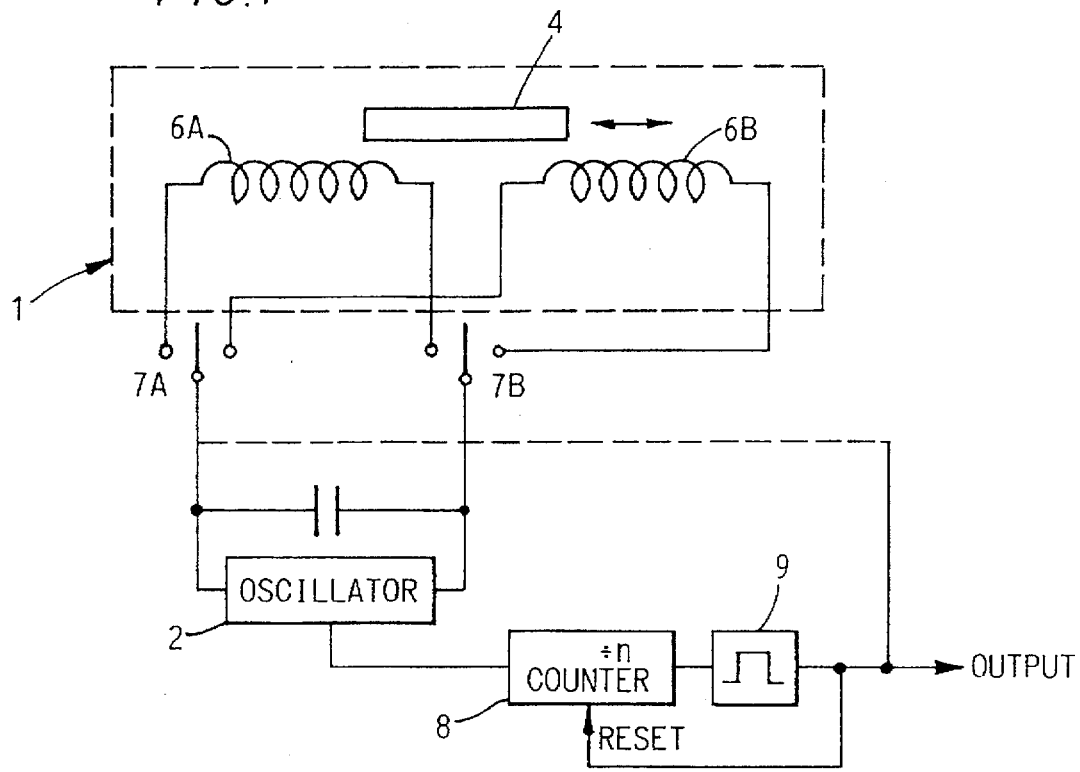
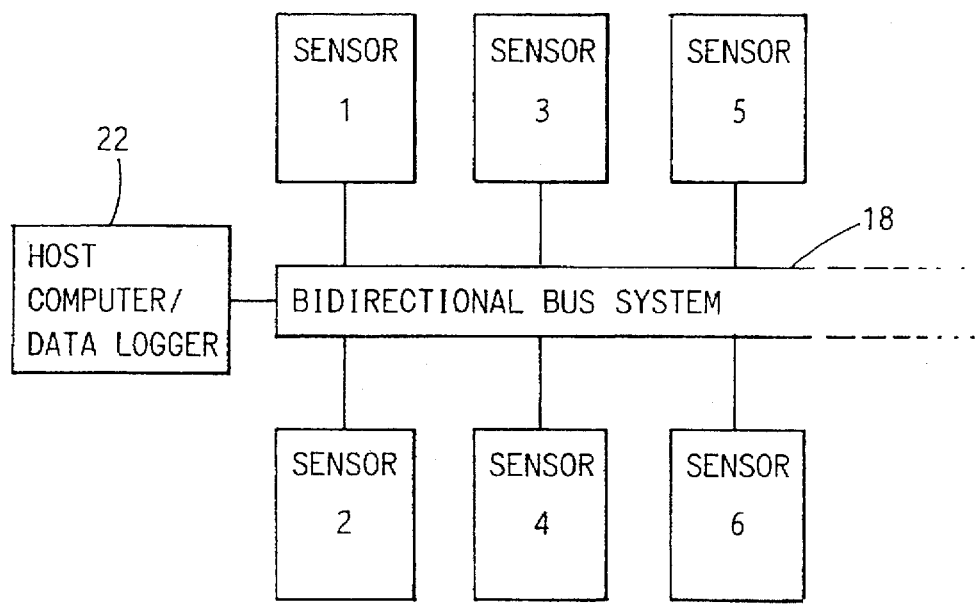

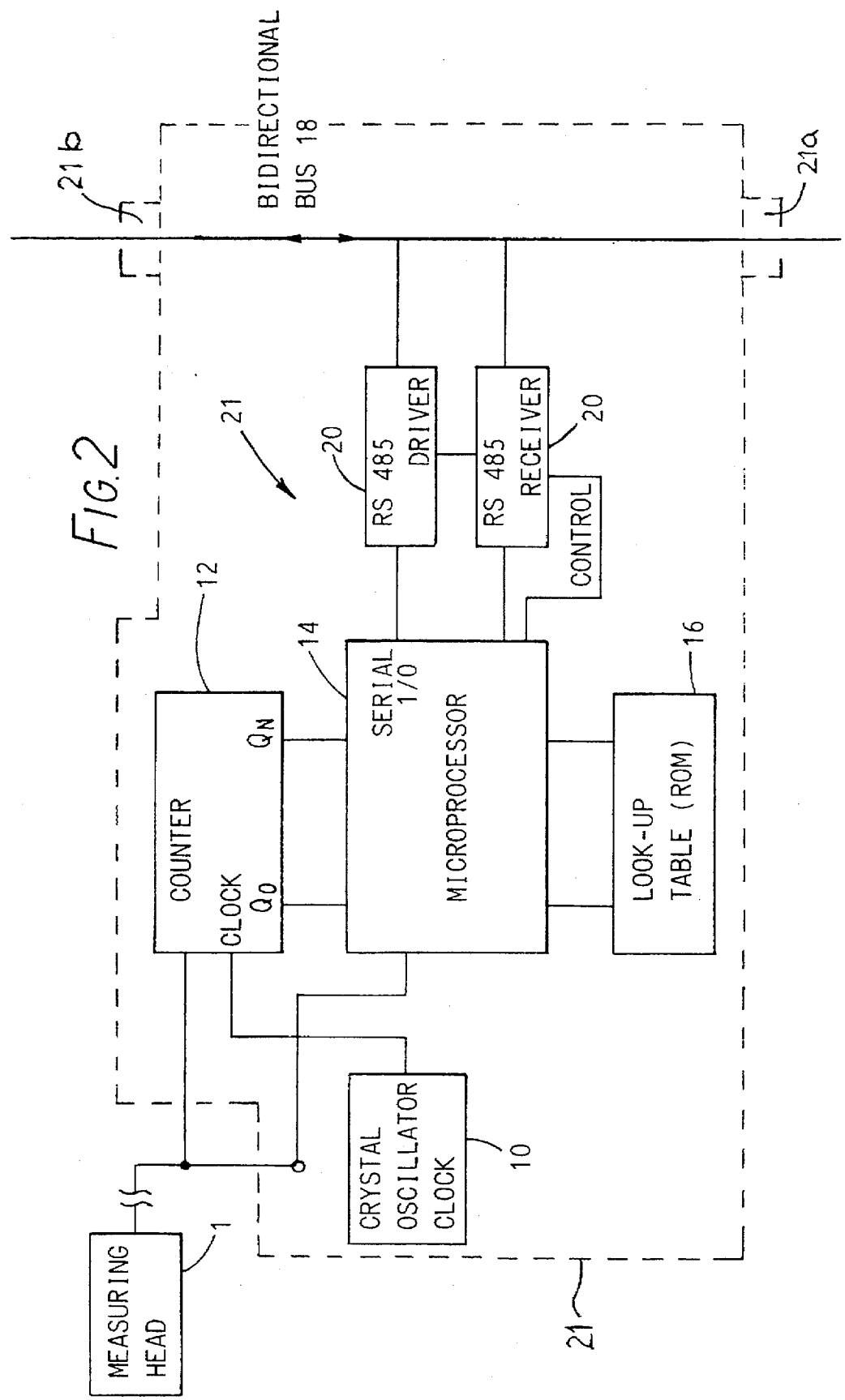

NETWORK-CONNECTABLE DISPLACEMENT SENSOR WITH STORED ID

This is a continuation of application Ser. No. 07/995,631 filed Dec. 17, 1992, now abandoned.

This invention relates to apparatus for measuring displacement using a sensor in association with processing means for calibration, linearisation and digital conversion.

There are many types of conventional displacement sensor, most of which produce an analogue output, for example, linear differential transducers. However, some sensors can give a digital output using Moiré fringe techniques or interferometry, but these are more suited to measuring large displacements, for example in machine tools.

Conventional analogue sensors produce very small signals requiring considerable amplification before it is possible to digitise and process the signal. In such systems, it is often necessary to provide a plug-in calibration unit special to the individual sensor, to enable standardised electronics to be used. When using a linear variable differential transformer in which an AC reference signal is applied to one coil and the amplitude and phase of the output from the other coil provide a measure of the amount and direction of movement of the core, a network of variable or select-on-test resistors is provided in the output circuit to enable the output amplitude to be standardised.

According to the invention there is provided apparatus for measuring displacement comprising a sensor head for varying the frequency of an oscillator in response to the displacement to be measured, means for measuring the frequency change, and a micro-processor for converting the measured frequency change to a digital output representing the displacement by reference to stored calibration coefficients specific to the sensor head, wherein the frequency measuring means, and micro-processor are mounted in a connector for connection to similar connectors of other sensor heads, and the microprocessor contains a unique ID for that sensor head, allowing a host computer to identify each sensor head.

The calibration coefficients form a look-up table which is conveniently stored in a ROM.

A displacement sensor embodying the invention may have a number of advantages, most notably, by converting the mechanical displacement into a shift in frequency, the sensor is able to produce a digital output without the need for high gain amplifiers or a/d converters.

These sensors may be connected together using a standard interface/bus, for example the RS485 or RS232 interface/bus.

According to the invention in a second aspect there is provided apparatus for measuring displacement comprising a sensor head for varying the frequency of an oscillator in response to the displacement to be measured, means for measuring the frequency change, and a microprocessor for converting the measured frequency change to a digital output representing the displacement by reference to stored calibration coefficients specific to the sensor head, wherein the sensor head comprises a core displaceable between at least two coils which are alternately connected to the oscillator, the frequency change between the two coils providing a measure of the displacement, and the displacement measuring apparatus further comprises a first counter coupled to the output of the oscillator and arranged to switch the connection between the coils and the oscillator after a time interval comprising at least n cycles of the oscillator.

Embodiments of the invention will now be described by way of example, and with reference to the accompanying drawings, in which:

FIG. 1 is a schematic diagram of a sensor head forming part of a sensor embodying the present invention;

FIG. 2 is a block schematic diagram of the sensor embodying the invention, including the sensor head shown in FIG. 1; and FIG. 3 is a typical installation including several sensors of the kind shown in FIG. 2.

The sensor head 1 of FIG. 1 measures displacement by converting it into a variation in the frequency of an oscillator 2. The displacement to be measured causes movement of a core of ferromagnetic material 4, such as radiometal alloy, within a pair or inductor coils 6A and 6B, thus causing a variation in the inductance thereof. Each of the coils 6A and 6B forms part of the turned circuit of the oscillator 2, and thus the frequency of oscillation varies in accordance with the displacement to be measured. The variation of frequency with displacement is not linear, but this non-linearity may be corrected within the processing circuitry.

The two coil system of FIG. 1 is a differential system in which the magnetic material 4 moves out of one coil 6A into a similar coil 6B mounted coaxially such that as the inductance of one inductor is reduced, the inductance of the other is increased, and the difference in frequencies is calculated subsequently in a microprocessor.

The output cycles of the oscillator 2, in FIG. 1, are counted in a first counter 8. After n cycles of the oscillation have been counted, the counter 8 produces an output pulse 9. The pulse 9 operates the two switches 7A and 7B which switch between the two coils 6A and 6B of the tuned circuit of the oscillator 2, to disconnect one of the coils 6A and 6B and connect the other coil to the tuned circuit. The output pulse 9 from the first counter 8 also resets the counter 8 to zero and inhibits the counter's operation for a period of time sufficient to allow the frequency of the oscillator 2 to stabilize, after which the counter 8 proceeds to count n cycles of the frequency due to the connected coil 6A or 6B.

The time between the trailing edge of one output pulse from the first counter 8 and the leading edge of the subsequent output pulse defines the period of n cycles of the oscillator for each coil 6A and 6B, and thus the frequencies of oscillation corresponding to each coil. The difference between the periods of n cycles corresponding to each coil is a function of the displacement to be measured.

To measure the period of n cycles of the oscillator 2, the output pulse 9 from the first counter 8 is applied to a second counter 12 of FIG. 2, which is driven from a high frequency crystal clock 10. At the trailing edge of the pulse 9, the second counter 12 is allowed to count cycles from the high frequency clock 10 until the leading edge of the subsequent output pulse from the first counter 8 in the measuring head 1 is received. The count from the second counter 12, which represents the period of n cycles of the oscillator 2 in the measuring head 1, and thus the frequency of oscillation, is loaded into the microprocessor 14 and the second counter 12 is reset to zero.

At the trailing edge of the output pulse 9 from the measuring head 1, the above process is repeated for the other of the two coils 6A and 6B.

The difference between the counts obtained corresponding to each coil 6A and 6B, which is representative of the displacement to be measured, is taken by the microprocessor 14 and this is compared with a look-up table 16 stored in the memory during initial calibration. The microprocessor 14 thus converts the count of the counter 12 into a positional reading, corrected for non-linearity of the frequency change with displacement and for the individual characteristics of the sensor head, and interpolates between stored values in the memory.

The output from the microprocessor is connected to a bi-directional interface/bus 18 via drivers 20, for example the RS485 or RS232 system. It is possible to process some of the data obtained, in the microprocessor, for example to determine maximum, minimum and mean results over a period, or to take measurements at predetermined times, thus reducing the amount of data needed to be transmitted over the bus system.

For each sensor of the kind shown in FIG. 2 the measuring or sensor head 1 is attached by a long lead to a connector 21 containing the processing circuitry, ie at least the elements 10, 12, 14, 16 and 20. This connector is designed to be plugged directly to other connectors of other sensors to build up the bi-directional bus 18 connecting the sensors to a host computer/data logger 22 as shown in FIG. 3. The connector 21 can comprise a plastics housing for the aforementioned processing circuitry. Alternatively, and as shown in FIG. 2, a metal housing can be used, for protection against radio-frequency interference. This metal housing is typically sealed to at least IP60 standard, and is provided with a D-type input socket 21a and a D-type output socket 21b to provide for the direct plug interconnection of successive units (ie without the need for a connecting lead with complementary connectors at each end) to form a single assembly mountable on the apparatus over which the individual sensor heads are distributed.

Each of the sensors is provided with a unique ID programmed into it at the factory so that the host computer can identify which sensor is in which position on the bus.

In another embodiment of the invention, the memory 16 of FIG. 2 in which the sensor calibration coefficients are stored, and the unique ID allocated to each sensor, are contained in a separate unit, which may be plugged into the connector 21 housing the processing circuitry. As such, any damage occurring to the associated sensor head or lead would not automatically require the entire unit to be replaced. Also, the memory 16 may be physically implemented in, for example, the form of a key and need not be reprogrammable.

Various alternatives to the embodiments described are possible and will occur to those skilled in the art. For example, alternative magnetic materials such as ferrite may be used for the moveable core. Also, whilst the two coil system has the advantage that being a differential measurement it is much less sensitive to temperature variation, a single coil system could be used. And while the oscillator 2, the switches 7A and 7B and the counter 8 are described as being in the sensor head 1, they can instead be in the connector 21.

For the two coil system, once the frequencies corresponding to each coil have been obtained, it is possible to take either the ratio or difference of the two frequencies to calculate the displacement measured by the sensor. In the case of the ratio of frequencies, the counts for the frequencies corresponding to each coil are separately transferred from the counter 12 to the microprocessor 14, which then calculates the ratio and compares this with the stored values in ROM 16. And if desired, the timing of the operation of the switches 7A and 7B, and the timing of the commencement of the counting of n cycles of the oscillator 2 for each coil 6A and 6B, can be controlled by the microprocessor 14.

We claim:

1. Apparatus for measuring displacement comprising a sensor head for varying the frequency of an oscillator in response to the displacement to be measured, means for measuring the frequency change, and a microprocessor for converting the measured frequency change to a digital output representing the displacement by reference to stored calibration coefficients specific to the sensor head, wherein the frequency measuring means and microprocessor are mounted in a connector remote from the sensor head, said connector being adapted to enable the connector to be plugged directly into similar connectors of other sensor heads, and the microprocessor contains a unique ID for that sensor head, allowing a host computer to identify each sensor head.

2. Apparatus as claimed in claim 1, in which the core is displaceable within a coil of the oscillator to vary the frequency.

3. Apparatus as claimed in claim 2, in which the core is displaceable between two coils which are alternately connected to the oscillator and the frequency change between the two coils provides a measure of the displacement.

4. Apparatus as claimed in claim 3, comprising a first counter coupled to the output of the oscillator and arranged to switch the connection between the coils and the oscillator after a time interval comprising at least n cycles of the oscillator.

5. Apparatus as claimed in claim 4, in which the means for measuring the frequency change comprises a second counter gated by the output of the first counter to count clock pulses, and means for generating a difference count corresponding to the difference of oscillator frequency betwen the two coils.

6. Apparatus as claimed in claim 4, in which the means for measuring the frequency change comprises a counter arranged to supply counts to the microprocessor corresponding to the two frequencies of the oscillator, the microprocessor being designed to calculate the difference in the frequencies for comparison with the stored calibration coefficients.

7. Apparatus as claimed in claim 4, in which the means for measuring the frequency change comprises a counter arranged to supply counts to the microprocessor corresponding to the two frequencies of the oscillator, the microprocessor being designed to calculate the ratio of the frequencies for comparison with the stored calibration coefficients.

8. Apparatus as claimed in claim 4, wherein the first counter and the oscillator are mounted in said connector.

* * * * *